United States Patent [19]

Mermelstein

[11] Patent Number: 4,515,473
[45] Date of Patent: May 7, 1985

[54] PHOTOELASTIC STRESS SENSOR SIGNAL PROCESSOR

[75] Inventor: Marc D. Mermelstein, Chevy Chase, Md.

[73] Assignee: Geo-Centers, Inc., Newton Upper Falls, Mass.

[21] Appl. No.: 650,229

[22] Filed: Sep. 13, 1984

[51] Int. Cl.³ ............................................. G01B 11/18
[52] U.S. Cl. ..................................... 356/33; 73/705; 73/862.38
[58] Field of Search ..................... 73/705, 800, 862.38, 73/862.62, 862.63, 862.64, 657; 250/225, 227; 350/371, 373, 400, 401, 406; 356/32, 33, 34, 35, 364, 365, 366, 368

[56] References Cited

U.S. PATENT DOCUMENTS

| | | | |
|---|---|---|---|
| 3,950,987 | 4/1976 | Slezinger et al. | 73/517 R |
| 4,010,632 | 3/1977 | Slezinger et al. | 73/800 |
| 4,321,831 | 3/1982 | Tomlinson et al. | 73/800 |
| 4,368,645 | 1/1983 | Glenn et al. | 73/705 |
| 4,442,350 | 4/1984 | Rashleigh | 73/657 |

*Primary Examiner*—Anthony V. Ciarlante
*Attorney, Agent, or Firm*—Louis Orenbuch

[57] ABSTRACT

A signal processor is arranged to process polarized light signals obtained from a stress sensor of the type having a photoelastic element that responds to stress by causing a phase difference between components of the polarized light propagating through that element. The stress sensor provides two output beams, each of which has a different polarized component of the transmitted light. The signal processor employs a pair of photodetectors which respond to the intensities of the two polarized light beams by converting the polarized light into electrical signals. Those two electrical signals provide the inputs to a difference differentiator that provides an output proportional to the difference between the derivatives of the inputs. The two electrical output signals of the photodetectors are also applied as inputs to a multiplier whose output is related to the product of its inputs. The square root of the output of the multiplier is obtained from a square root device and is used as the divisor in a divider whose numerator is the output of the difference differentiator. The output of the divider is applied to the input of an integrator whose output is a measure of the stress imposed on the photoelastic element.

2 Claims, 4 Drawing Figures

PHOTOELASTIC STRESS SENSOR SIGNAL PROCESSOR

FIELD OF THE INVENTION

This invention relates in general to the processing of signals. More particularly, the invention pertains to the processing of signals, provided by a photoelastic polarimetric stress sensor, in a manner that reduces signal fading due to environmental changes, provides greater linear dynamic range than prior signal processing arrangements, and produces an output that is virtually free of noise originating from fluctuations in the light intensity of the polarized light directed into the photoelastic element of the stress sensor.

BACKGROUND OF THE INVENTION

Photoelastic polarimetric stress sensing systems require signal processing in order to transform the optical signals provided by the stress sensor into an electrical signal that is proportional to the amplitude of the stress imposed on the stress sensor by the phenomenon of interest. Prior signal processing arrangements are subject to signal fading under changing environmental conditions, have a small linear dynamic range, and are adversely affected by fluctuations in the intensity of the polarized light provided by the light source of the sensing system. To deal with those undesired limitations, some prior signal processors have employed feedback to the photoelastic element to compensate for changing environmental conditions while other prior signal processors have utilized four or more optical outputs derived from the stress sensor.

OBJECTS OF THE INVENTION

The principal object of the invention is to provide a signal processor for photoelastic polarimetric stress sensors that gives improved results over prior signal processors. More particularly, an object of the invention is to provide constant sensor sensitivity over an extended range so as to reduce the sensor sensitivity dependence on environmental conditions while allowing the instrument to operate over a broader range. Another object of the invention is to provide a signal processor that is insensitive to effects arising from fluctuations in the light provided by the light source of the polarimetric instrument.

THE INVENTION

The invention resides in a signal processor for a polarimetric stress sensor system of the kind having a photoelastic element which responds to stress by causing a phase difference proportional to the stress to occur between components of polarized light propagating through the photoelastic element. The signal processor utilizes two signals obtained from a pair of photodetectors that respond to the intensities of two light beams. Each of the two beams has a different component of the polarized light that passed through the photoelastic element. The photodetectors respond to the polarized light beams by providing two electrical signals. Those two electrical signals are applied to the inputs of a difference differentiator that provides an output proportional to the derivative of the difference of the inputs. The two photodetector output signals are also applied as inputs to a multiplier whose output is related to the product of its inputs. The square root of the output of the multiplier is used as the divisor in a divider whose numerator is the output of the difference differentiator. The output of the divider is integrated to obtain a voltage signal that is a measure of the stress imposed on the photoelastic element.

THE DRAWINGS

DETAILED DESCRIPTION OF THE PREFERRED EMBODIMENT

Figure 1:
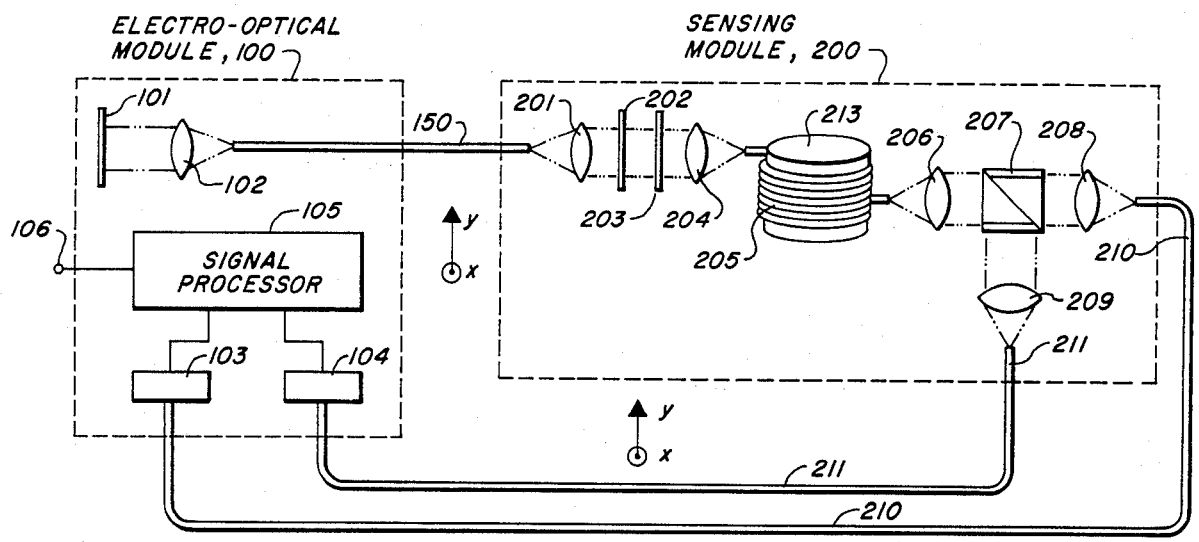
FIG. 1 shows the scheme of a photoelastic stress sensor system of the type in which the invention is employed.

Referring now to FIG. 1, there is shown the scheme of a photoelastic polarimetric stress sensor instrument of the type in which the invention is employed. In that type of instrument, the photoelastic sensing element may be located in a sensing module 200 which is connected to an electro-optical module 100 by optical fibers that provide light transmission lines between the sensing module and the electro-optical module. It is not necessary to have the instrument divided into two modules but it is convenient to have the "active sensing element" in a separate unit and, consequently, the typical instrument is here described as being so arranged.

The electro-optical module 100 contains a source of light 101 which usually is a laser that provides a beam of light. The light beam is focused by a lens 102 upon the input end of an optical fiber 150 that transmits the light to module 200 where a lens 201 collimates the emergent light into a beam that is directed through a polarizer 202 which polarizes the light along two orthogonal axes. The polarized light is then passed through a quarter wave plate 203 and emerges as circularly polarized light. In essence the quarter wave plate introduces a biasing phase delay of 90° between the two orthogonal components of the electric field vector. The circularly polarized light is focused by a lens 204 upon the input end of a photoelastic element. In some instruments, the polarizer 202, quarter wave plate 203, and lens 204 may be situated in the electro-optical module and the optical fiber 150 is then employed to transmit the circularly polarized light to the sensing module 200.

For purposes of illustration, the photoelastic element is here depicted as a single mode optical fiber 205. To enable that fiber to be stressed, the fiber is wound upon a drum 213. The drum imposes stress on the fiber 205 in response to a phenomenon to be measured. For example, the drum may expand or retract in response to changes in pressure. As another example, the drum may be magnetostrictive so as to respond to the presence of a magnetic field.

It should be understood that other kinds of photoelastic elements can be used and that the means for imposing stress on the photoelastic element will, in general, depend upon the kind of photoelastic element that is employed.

A single mode optical fiber is a convenient photoelastic element because in its unstressed condition, polarized light is transmitted through the fiber without any change in polarization. When the single mode optical fiber is stressed, the fiber exhibits birefringence which introduces a phase delay between two orthogonally polarized components of the light propagating in the fiber. The polarized light passing through the fiber 205 undergoes a total phase delay $\Gamma$ equal to the stress-induced birefringence times the stressed lenght L of the fiber.

The light emerging from the output end of photoelastic element 205 is collimated by a lens 206 and the X and Y polarized components of that light are separated by a beam splitter 207. The beam splitter can be a Glan-Thompson prism which directs one polarized component to the lens 208 and directs the other polarized component to the lens 209. Other beam splitting arrangements may be used but those other arrangements usually entail some loss of light intensity in transmitting the light to the lenses. The X polarized component is focused by lens 208 onto the input end of an optical fiber 210 which transmits that light to a photodetector 103 in the electro-optical module 100. The Y polarized component of the light is focused by lens 209 onto the input end of an optical fiber 211 which transmits that light to another photodetector 104 in the electro-optical module. It is obvious that the separation of the X and Y polarized light components could have been accomplished in the electro-optical module rather than in the sensing module by using a single optical fiber to transmit the light output of the photoelastic element 205 to the electro-optical module.

The intensities $I_x$ and $I_y$ of the light propagating in fibers 210 and 211 are given by $$I_x = \tfrac{1}{2} I_o [1 + \cos \Gamma]$$

$$I_y = \tfrac{1}{2} I_o [1 - \cos \Gamma]$$

where $I_o$ is the intensity of the light emerging from the photoelastic element 205. The total phase delay is equal to the sum of three components: $\Gamma = \pi/2 + \Gamma_o + \Gamma_1$. The quarter wave plate 203 provides the preferred phase delay bias of 90°. $\Gamma_o$ is the slowly varying phase delay produced by changes in ambient conditions, such as a change in temperature or a change in atmospheric pressure, etc. Phase delay brought about by ambient conditions can result in a loss of sensitivity of the sensor instrument. The third component, $\Gamma_1$, is the phase delay brought about by the phenomenon of interest. The intensities of the light output from fibers 210 and 211 may be more explicitly written as:

$$I_x = \tfrac{1}{2} I_o [1 - \sin \Gamma_o \cos \Gamma_1 - \cos \Gamma_o \sin 64_1]$$

$$I_y = \tfrac{1}{2} I_o [1 + \sin \Gamma_o \cos \Gamma_1 + \cos \Gamma_o \sin \Gamma_1]$$

The light propagating in fibers 210 and 211 (of intensities $I_x$ and $I_y$) are transmitted by those fibers to the photodetectors 103 and 104 which convert the light into electrical signals. Those electrical signals are processed by the signal processor 105 in a manner that transforms the optical outputs $I_x$ and $I_y$ into an electrical signal proportional to the amplitude of the signal field. The signal processor of the invention, in performing the optical to electrical transformation, acts to greatly reduce distortion originating from three sources. The sources of distortion are: (1) signal fading due to environmentally-induced changes in the phase delay $\Gamma_o$, (2) non-linear response to large signal amplitudes, and (3) noise associated with fluctuations in the light intensity $I_o$.

Figure 2:
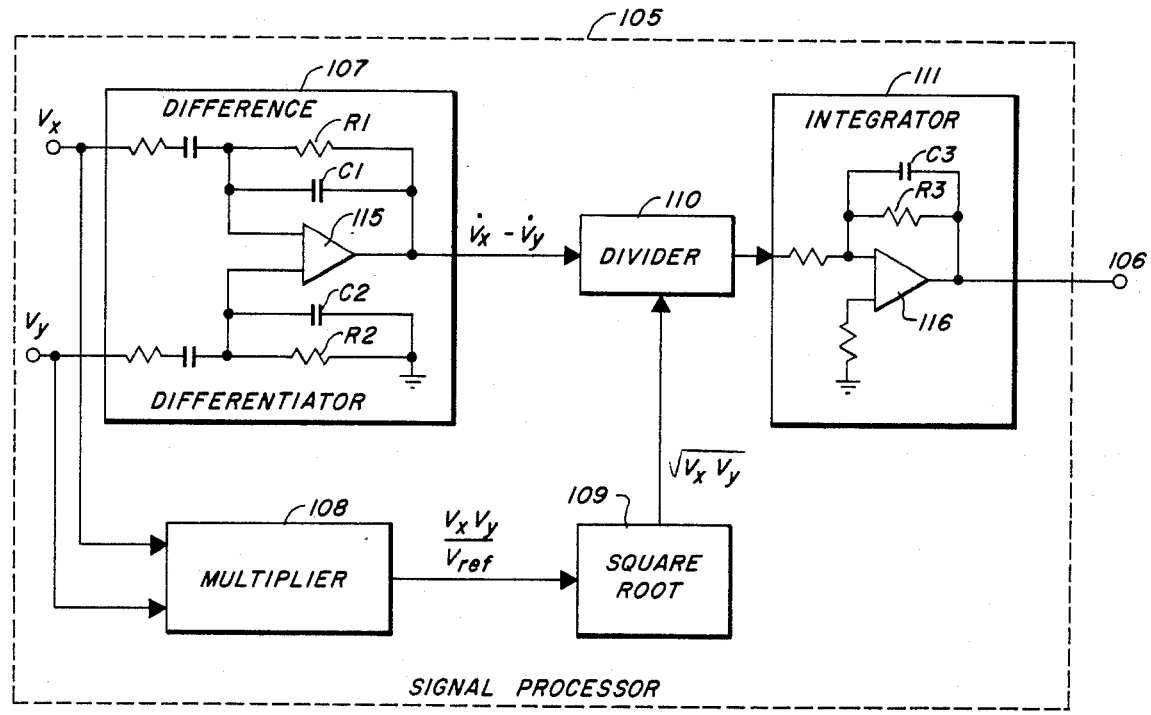
FIG. 2 shows the scheme of the preferred embodiment of the invention.

Referring now to FIG. 2, there is shown the preferred embodiment of the improved signal processing arrangement for providing an output that is virtually free of noise arising from fluctuations in the light intensity of the polarized light directed into the photoelastic element. That improved arrangement reduces signal fading due to environmentally induced changes in the phase delay $\Gamma_o$ and provides greater linear dynamic range than "prior art" signal processing arrangments.

In the improved signal processor the output signals $V_x$ and $V_y$ from photodetectors 103 and 104 are applied to the inputs of a difference differentiator 107 having an operational amplifier 115 whose output is fed back through a resistor R1 and capacitor C1 to its non-inverting input while its inverting input is connected to ground through resistor R2 and capacitor C2. The differentiator typically differentiates frequencies between 0 and 10.0 KH$_z$ while attenuating higher input frequencies. The frequency regime can be chosen to suit the needs of the sensor. The difference differentiator provides an output equal to $\dot{V}_x - \dot{V}_y$. That is, the difference differentiator produces an output proportional to the difference between the derivatives $\dot{V}_x$ and $\dot{V}_y$.

The $V_x$ and $V_y$ output signals of the photodetectors 103 and 104 also provide the inputs to a multiplier 108 which can be a conventional unit. The output of the multiplier 108 is given by $V_x V_y / V_{Ref}$ where $V_{Ref}$ is a reference voltage, preferably of 10 volts. The output of the multiplier is fed to a square root device 109 whose output is the square root $\sqrt{V_x V_y}$ of its input. The square rooter can be any of the suitable conventional electronic devices which are now readily available.

The $\sqrt{V_x V_y}$ output of the square rooter is utilized as the divisor in the divider 110. The numerator for the divider is supplied by the $\dot{V}_x - \dot{V}_y$ output of the difference differentiator. The output of the divider 110 is fed to the input of an integrator 111. For purposes of illustration the integrator is shown as a conventional device having an operational amplifier 116 arranged to perform integration. In that arrangement, the feedback capacitor C3 is shunted by a large resistance R3 in order to limit any offset voltage contribution to integrator's output. Hence, the output of integrator 111 is a voltage proportional to the amplitude of the phenomenon-induced phase delay $\Gamma(t)$ and that integrated output is a measure of the stress imposed on the photoelastic element 205.

The photodetectors 103 and 104 convert the light intensities $I_x$, $I_y$ and $I_o$ to voltages $V_x$, $V_y$, and $V_o$, respectively. Those quantities are then related by:

$$V_x = \tfrac{1}{2} V_o [1 - \sin \Gamma_o \cos \Gamma_1 - \cos \Gamma_o \sin \Gamma_1]$$

$$V_y = \tfrac{1}{2} V_o [1 + \sin \Gamma_o \cos \Gamma_1 + \cos \Gamma_o \sin \Gamma_1]$$

Conventional signal processors attempt to obtain a voltage proportional to the phenomenon-induced stress by constructing the difference voltage $\Delta V$:

$$\Delta V = V_o [\sin \Gamma_o \cos \Gamma_1 + \cos \Gamma_o \sin \Gamma_1]$$

In order to obtain a voltage that is linearly proportional to the phenomenon-induced phase delay $\Gamma_1$, it is generally required that the phenomenon-induced phase delay be small, i.e. $\Gamma_1(t) < 1$. The difference voltage may then be written as $$\Delta V = V_o[\sin \Gamma_o + \cos \Gamma_o \Gamma_1(t)]$$

The voltage proportional to the signal is given by:

$$\Delta V = V_o \cos \Gamma_o \Gamma_1(t)$$

Two problems are evident:

(1) the voltage response $\Delta V$ is dependent upon $\Gamma_o$ so that the signal voltage is subject to fading under changing environmental conditions, and (2) the linear dynamic range of the sensor is limited by the requirement that the signal-induced phase delay $\Gamma_1(t)$ be small.

The signal processor here disclosed significantly reduces the signal fading problem while extending the linear dynamic range.

The phase delay $\Gamma(t)$ attributed to the phenomenon imposed stress on the photoelastic element is given by:

$$\Gamma(t) = \frac{1}{2} \int_o^t dt' \frac{\dot{V}_x(t') - \dot{V}_y(t')}{\sqrt{V_x(t')V_y(t')}}$$

More explicitly this may be rewritten as $$V = V_{ref}\Gamma(t) = \frac{1}{2} V_{ref} \int_o^{t'} dt' \left[ \frac{\cos\Gamma_o \cos\Gamma_1 - \sin\Gamma_o \sin\Gamma_1}{\cos\Gamma_o \cos\Gamma_1 - \sin\Gamma_o \sin\Gamma_1} \right] \dot{\Gamma}(t')$$

where $V_{ref}$ is a reference voltage determined by the analogue electronics. It is seen that this equation is not explicitly dependent upon the phase delay $\Gamma_o$ which is subject to environmentally-induced changes. Rather, it is limited by the requirement that $\epsilon$, given by:

$$\epsilon = \cos \Gamma_o \cos \Gamma_1 - \sin \Gamma_o \sin \Gamma_1$$

remain non-zero.

The phenomenon-induced phase delay is represented by $$\Gamma_1(t) = \Gamma_1^\circ \cos wt$$

where $\Gamma_1^\circ$ is the phase delay amplitude that is proportional to the signal field amplitude and $w$ is the signal frequency. The quantity $\epsilon$ will be in the limited region given by:

$$\frac{n\pi}{2} - \Gamma_1^\circ \leq \Gamma_o \leq \frac{n\pi}{2} + \Gamma_1^\circ \quad n = 1, 3, 5, \ldots$$

Hence, constant and maximum signal detection sensitivity is obtained for all valuse of $\Gamma_o$ outside the specified phase delay range. This provides enhanced sensor stability against changing environmental conditions. FIG. 2 shows the sensitivity $\mu$ of the signal processor as a function of phase delay $\Gamma_o$. This result is shown in a manner that facilitates comparison with the sensitivity of the unprocessed signal. Even for small signals, it is evident that the disclosed signal processor provides constant maximum sensitivity outside singular points in the neighborhood of $n\pi/2$. This greatly improves the signal fading immunity for the polarimetric sensor without the inclusion of active feedback elements or additional optical outputs.

Figure 3:
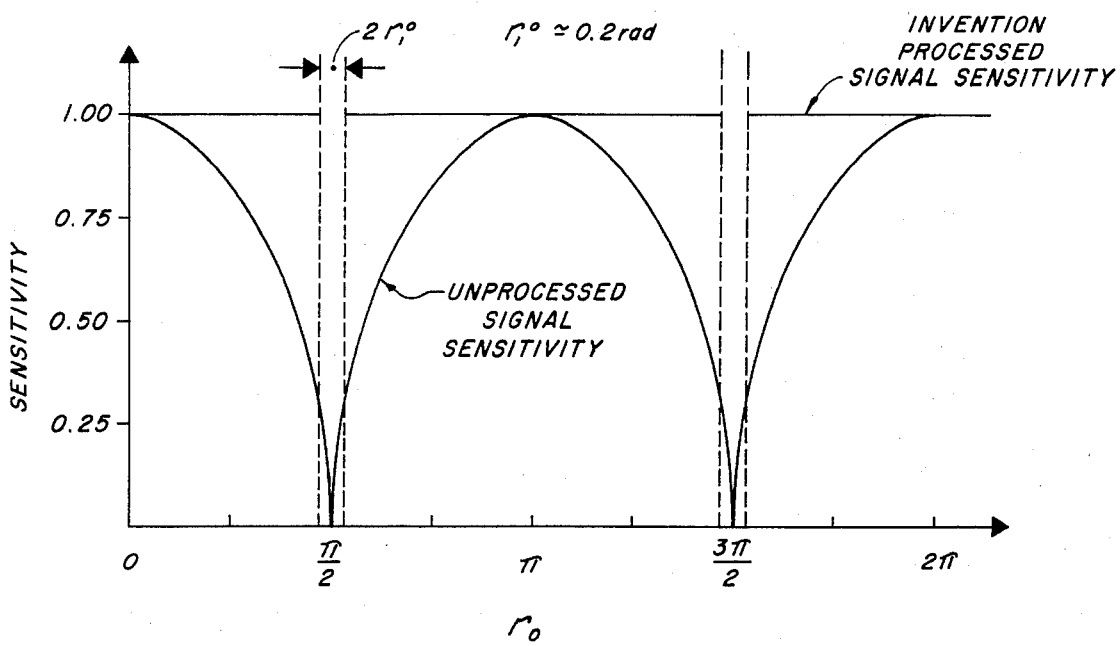
FIG. 3 shows the sensitivity of the preferred embodiment of the invention as a function of phase delay.
Figure 4:
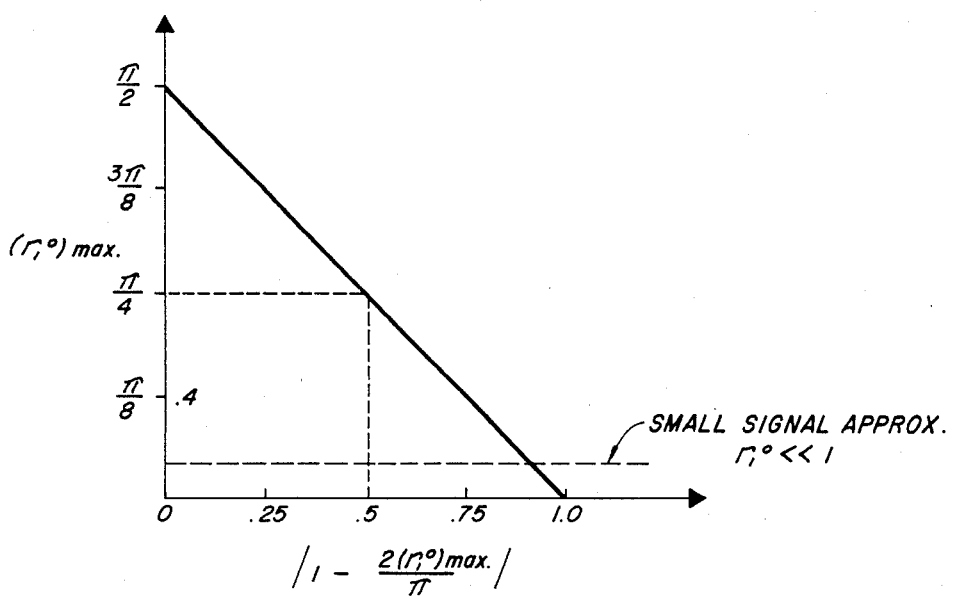
FIG. 4 is a graph showing the linear dynamic range of the preferred embodiment of the invention as a function of useful operating range.

The linear dynamic range of the signal processor is a measure of the range over which the amplitude of the signal-induced phase delay $\Gamma_1^\circ$ can vary without introducing non-linearities in the signal processing. The small signal approximation required for conventional signal processing, limits the maximum value of $\Gamma_1^\circ$ to approximately 0.1 radians. The disclosed signal processor extends the dynamic range at the expense of some reduction in permissible operating range for $\Gamma_o$. Hence, there is a trade-off between operating point and linear dynamic range. FIG. 3 illustrates the linear dynamic range (or maximum value for $\Gamma_1^\circ$) as a function of the percentage of useful operating point range. For example, a maximum phase delay amplitude of $\pi/4$ corresponds to the availability of 50% of the operating point range for $\Gamma_o$ and represents an approximate order of magnitude increase in linear dynmic range.

Although the invention has been described as a signal processor comprised of electronic apparatus such as an integrator, divider, multiplier, etc., it is evident to those knowledgeable of the computer art that the functions of the electronic apparatus can be performed by a computer under the control of a program that causes the computer to perform the functions of the apparatus or equivalents of those functions. It is, therefore, intended that the invention not be limited to the embodiment here illustrated and described. Rather, it is intended that the invention be construed in accordance with the appended claims.

I claim:

1. In a photoelastic polarimetric stress sensor of the type having
   (a) a photoelastic element,
   (b) means for directing polarized light into the photoelastic element,
   (c) stress imposing means responsive to a phenomenon to be measured for stressing the photoelastic element,
   (d) beam splitter means for splitting the polarized light passed through the photoelastic element into a plurality of beams each of which has a different polarized component of the light transmitted through the photoelastic element, and
   (e) means responsive to the light intensities of the split beams for providing an output that is a measure of the stress on the photoelastic element,
   the improvement wherein the means responsive to the light intensities of the split beams comprises
   (i) a pair of photodetectors, each photodetector providing an electrical output signal in response to a different one of the split beams,
   (ii) a difference differentiator responsive to the outputs of the pair of photodetectors for providing an output proportional to the difference between derivatives of its inputs,
   (iii) a multiplier responsive to the outputs of the pair of photodetectors for providing an output related to the product of its inputs,
   (iv) a square rooter responsive to the output of the multiplier for providing an output that is the square root of its input,
   (v) a divider responsive to the output of the difference differentiator as the numerator and the output of the square rooter as the divisor for providing an output signal, and
   (vi) an integrator responsive to the output of the divider for providing an output signal that is a measure of the imposed stress.

2. A method of processing signals provided by a photoelastic polarimetric stress sensor of the type having
(a) a photoelastic element,
(b) means for directing polarized light into the photoelastic element,
(c) stress imposing means responsive to a phenomenon to be measured for stressing the photoelastic element,
(d) beam splitter means for splitting the polarized light passed through the photoelastic element into a plurality of beams each of which has a different polarized component of the light transmitted through the photoelastic element, and
(e) a pair of photodetectors, each photodetector providing an electrical output signal in response to a different one of the split beams,
the method comprising the steps of
(i) differentiating the outputs of the photodetectors and obtaining the difference between those derivatives,
(ii) multiplying the outputs of the photodetectors and obtaining an output related to the product thereof,
(iii) obtaining the square root of the multiplied output,
(iv) dividing the difference obtained in the first step by the square root of the multiplied output, and
(v) integrating the resultant of the preceding division.

* * * * *